(12) United States Patent
Lee et al.

(10) Patent No.: US 12,518,711 B2
(45) Date of Patent: Jan. 6, 2026

(54) HEAD-UP DISPLAY SYSTEM AND BACKLIGHT ADJUSTING METHOD THEREOF

(71) Applicant: AUO Corporation, Hsinchu (TW)

(72) Inventors: Yueh-Heng Lee, Hsinchu (TW); Chia-Hung Chen, Hsinchu (TW); Chih-Hao Hung, Hsinchu (TW); Hsuan-Jui Peng, Hsinchu (TW); Yen-Ju Huang, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 18/948,443

(22) Filed: Nov. 14, 2024

(65) Prior Publication Data
US 2025/0363959 A1 Nov. 27, 2025

(30) Foreign Application Priority Data
May 23, 2024 (TW) ................... 113119143

(51) Int. Cl.
*G09G 3/34* (2006.01)
*G09G 3/00* (2006.01)

(52) U.S. Cl.
CPC ........... *G09G 3/3406* (2013.01); *G09G 3/001* (2013.01); *G09G 2354/00* (2013.01); *G09G 2360/144* (2013.01)

(58) Field of Classification Search
CPC .................................................. G09G 3/3406
See application file for complete search history.

(56) References Cited

U.S. PATENT DOCUMENTS

| 10,565,962 | B2 | 2/2020 | Li |
| 11,735,138 | B2 | 8/2023 | Seder et al. |
| 2019/0206362 | A1* | 7/2019 | Li .......................... B60K 35/28 |
| 2020/0039438 | A1 | 2/2020 | Umezawa |
| 2021/0008981 | A1 | 1/2021 | Suzuki et al. |
| 2024/0379038 | A1* | 11/2024 | Yang .................... G09G 3/3629 |

FOREIGN PATENT DOCUMENTS

| CN | 108196366 | 7/2020 |
| CN | 111886534 | 11/2020 |
| WO | 2018159319 | 9/2018 |

* cited by examiner

*Primary Examiner* — Gustavo Polo
(74) *Attorney, Agent, or Firm* — JCIPRNET

(57) ABSTRACT

A head-up display system and a backlight adjusting method thereof are provided. The head-up display system includes at least a first ambient light sensor, a projection display panel, and a display control circuit. The first ambient light sensor is used to provide an ambient light brightness value. The projection display panel has a plurality of display areas. The display control circuit is coupled to the first ambient light sensor and the projection display panel for comparing the ambient light brightness value with a plurality of brightness thresholds, so as to select one of a plurality of brightness adjustment algorithms based on the comparison, and adjust a plurality of backlight brightness values of the display areas based on the selected brightness adjustment algorithm.

11 Claims, 15 Drawing Sheets

| R11 | R12 | R13 | R14 | R15 |
|---|---|---|---|---|
| R21 | R22 | R23 | R24 | R25 |
| R31 | R32 100% | R33 100% | R34 100% | R35 |
| R41 | R42 100% | R43 100% | R44 100% | R45 |
| R51 | R52 | R53 | R54 | R55 |

Pimage

FIG. 3A

| R11 | R12 | R13 | R14 | R15 |
|---|---|---|---|---|
|  |  | 100% |  |  |
| R21 | R22 | R23 | R24 | R25 |
|  | 100% | 100% | 100% |  |
| R31 | R32 | R33 | R34 | R35 |
| 100% | 100% | 100% | 100% | 100% |
| R41 | R42 | R43 | R44 | R45 |
| 100% | 100% | 100% | 100% | 100% |
| R51 | R52 | R53 | R54 | R55 |
|  | 100% | 100% | 100% |  |

Pimage

FIG. 4A

| R11 | R12 | R13 10% | R14 | R15 |
| R21 | R22 (10+5)/2 =7.5% | R23 100% | R24 (10+5)/2 =7.5% | R25 |
| R31 5% | R32 100% | R33 100% | R34 100% | R35 5% |
| R41 15% | R42 100% | R43 100% | R44 100% | R45 40% |
| R51 | R52 15% | R53 70% | R54 40% | R55 |

Pimage

FIG. 4C

HEAD-UP DISPLAY SYSTEM AND BACKLIGHT ADJUSTING METHOD THEREOF

CROSS-REFERENCE TO RELATED APPLICATION

This application claims the priority benefit of Taiwan application serial no. 113119143, filed on May 23, 2024. The entirety of the above-mentioned patent application is hereby incorporated by reference herein and made a part of this specification.

BACKGROUND OF THE INVENTION

Field of the Invention

The invention relates to a vehicle display system, and in particular to a head-up display system and a backlight adjusting method thereof.

Description of Related Art

A head-up display (HUD) is a driving assistance instrument used in vehicles. Head-up means that the driver may see the important information he or she needs without looking down at the instrument panel. The head-up display has been used in vehicle display systems due to the convenience and the ability thereof to improve driving safety. Current techniques adopting Ambient Light Sensor (ALS) to adjust light brightness are all based on the same algorithm to adjust the lighting ratio of all pixels on the display panel. However, this adjusting method may not take into account all lighting conditions, and requires an ultra-high-brightness display to overcome the impact of the bright sun on the line of sight.

SUMMARY OF THE INVENTION

The invention provides a head-up display system and a backlight adjusting method thereof that may adjust a backlight of a display panel according to the current usage situation to provide good visual effects.

A head-up display system of the invention includes at least a first ambient light sensor, a projection display panel, and a display control circuit. The first ambient light sensor is used to provide an ambient light brightness value. The projection display panel has a plurality of display areas. The display control circuit is coupled to the first ambient light sensor and the projection display panel for comparing the ambient light brightness value with a plurality of brightness thresholds, so as to select one of a plurality of brightness adjustment algorithms based on the comparison, and adjust a plurality of backlight brightness values of the display areas based on the selected brightness adjustment algorithm.

A backlight adjusting method of a head-up display system of the invention includes the following steps. An ambient light brightness value is provided via at least one first ambient light sensor; the ambient light brightness value is compared with a plurality of brightness thresholds via a display control circuit; one of a plurality of brightness adjustment algorithms is selected based on the comparison via the display control circuit; a plurality of backlight brightness values of a plurality of display areas of a projection display panel is adjusted based on the selected brightness adjustment algorithm via the display control circuit.

Based on the above, in the head-up display system and the backlight adjusting method thereof of an embodiment of the invention, since the display control circuit evaluates the ambient brightness based on the ambient light brightness value and the brightness threshold, and selects one of the brightness adjustment algorithms accordingly, the display control circuit may adjust the backlight brightness values of the display areas of the projection display panel according to different lighting conditions to suit the current usage situation, thereby providing good visual effects.

In order to make the aforementioned features and advantages of the disclosure more comprehensible, embodiments accompanied with figures are described in detail below.

BRIEF DESCRIPTION OF THE DRAWINGS

FIG. 3A is a schematic diagram of regional backlight modulation of a second brightness adjustment algorithm according to an embodiment of the invention.

FIG. 4A is a schematic diagram of regional backlight modulation of a third brightness adjustment algorithm according to an embodiment of the invention.

FIG. 4C is a schematic diagram of regional backlight modulation of a fourth brightness adjustment algorithm according to an embodiment of the invention.

DESCRIPTION OF THE EMBODIMENTS

Unless otherwise defined, all terms (including technical and scientific terms) used herein have the same meaning as commonly understood by those skilled in the art to which this invention belongs. It will be further understood that terms such as those defined in commonly used dictionaries should be construed to have meanings consistent with their meanings in the context of the relevant technique and the invention, and are not interpreted in an idealized or overly formal sense unless expressly defined as such herein.

It will be understood that although the terms "first," "second," "third" etc. may be used herein to describe various elements, components, regions, layers, and/or sections, these elements, components, regions, and/or sections should not be limited by these terms. These terms are only used to distinguish one element, component, region, layer, or section from another element, component, region, layer, or section. Thus, a "first element", "component", "region", "layer", or "section" discussed below may be termed a second element, component, region, layer, or section without departing from the teachings herein.

The terminology used herein is for the object of describing particular embodiments only and is not intended to be limiting. As used herein, the singular forms "a", "an", and "the" are intended to include the plural forms including "at least one" unless the content clearly dictates otherwise. "Or" means "and/or". As used herein, the term "and/or" includes any and all combinations of one or a plurality of the associated listed items. It will also be understood that when used in the present specification, the terms "comprises" and/or "includes" designate the presence of recited features, regions, entities, steps, operations, elements, and/or sections. However, the presence or addition of one or a plurality of other features, regional entities, steps, operations, elements, sections, and/or combinations thereof is not excluded.

Figure 1A:
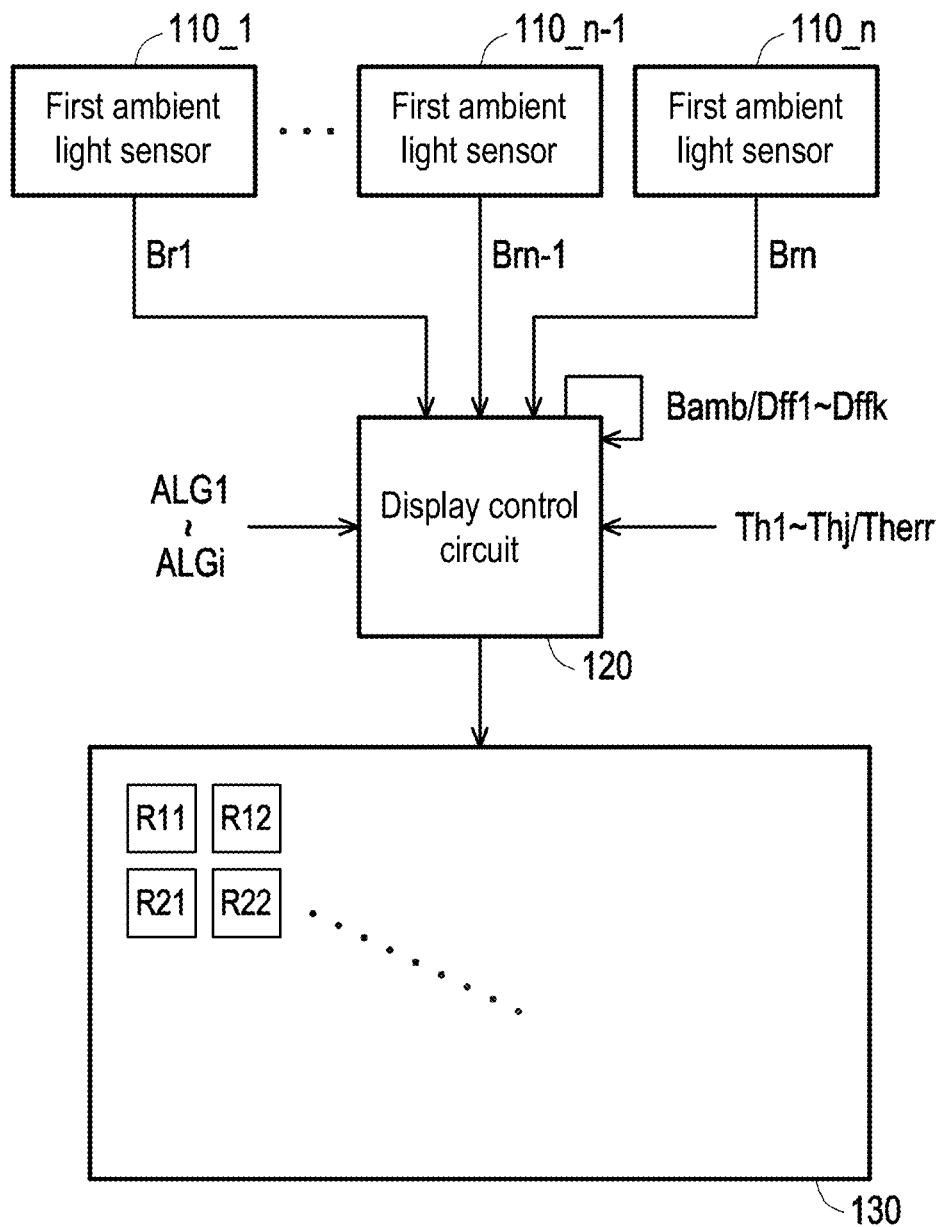
FIG. 1A is a system schematic diagram of a head-up display system according to an embodiment of the invention.

FIG. 1A is a system schematic diagram of a head-up display system according to an embodiment of the invention. Please refer to FIG. 1. In the present embodiment, a head-up display system 100 at least includes at least one first ambient light sensor (such as 110_1 to 110_n), a display control circuit 120, and a projection display panel 130, wherein n is a positive integer greater than or equal to 1. The first ambient light sensors 110_1 to 110_n are coupled to the display control circuit 120 and used to provide output brightness values Br1 to Brn to the display control circuit 120 to allow the display control circuit 120 to determine/decide/select an ambient light brightness value Bamb based on the output brightness values Br1 to Brn, that is, the first ambient light sensors 110_1 to 110_n may be equivalent to providing the ambient light brightness value Bamb.

The projection display panel 130 has a plurality of display areas (such as R11 to R22) divided based on dimming requirements. The display control circuit 120 is coupled to the first ambient light sensors 110_1 to 110_n and the projection display panel 130 for comparing the ambient light brightness value Bamb with a plurality of brightness thresholds Th1 to Thj, so as to select one of a plurality of brightness adjustment algorithms ALG1 to ALGi based on the comparison, and adjust a plurality of backlight brightness values of display areas R11 to R55 based on the selected brightness adjustment algorithms ALG1 to ALGi, wherein i and j are positive integers greater than or equal to 1.

Based on the above, since the display control circuit 120 takes into consideration different ambient brightnesses to select one of the brightness adjustment algorithms ALG1 to ALGi, the display control circuit 120 may adjust the backlight brightness values of the display areas of the projection display panel 130 according to different lighting conditions to suit the current usage situation, thereby providing good visual effects.

In an embodiment of the invention, when the quantity of first ambient light sensors (such as 110_1 to 110_n) is 1, the output brightness value (e.g., Br1) of the first ambient light sensor (e.g., 110_1) may be directly used as the ambient light brightness value Bamb. When there are a plurality of first ambient light sensors 110_1 to 110_n, the display control circuit 120 uses the highest one of the plurality of output brightness values Br1 to Brn of the first ambient light sensors 110_1 to 110_n as the ambient light brightness value Bamb. When there are a plurality of first ambient light sensors 110_1 to 110_n, the interference caused by brightness differences or malfunctions (such as debris and buses) of the ultra-long screen may be eliminated.

In an embodiment of the invention, the display control circuit 120 may compare a plurality of difference values Dff1 to Dffk between the output brightness values Br1 to Brn, for example, the difference value between the brightness values Br1 and Br2 is output, and the difference value between the brightness values Br1 and Br3 is output. In particular, k is a positive integer and is related to n. Moreover, when one of the difference values Dff1 to Dffk is greater than the difference threshold Therr, a warning message is provided via the projection display panel 130.

In the present embodiment, the difference values Dff1 to Dffk may be calculated one by one, and when the calculated difference value is greater than the difference threshold Therr, the calculation of the difference value is stopped until the next detection cycle. Alternatively, the difference threshold value Therr may be compared after all the difference values Dff1 to Dffk are calculated. This may be determined according to the circuit design, and the embodiments of the invention are not limited thereto.

In the present embodiment, the brightness thresholds Th1 to Thj, the difference threshold Therr, and the brightness adjustment algorithms ALG1 to ALGi may be stored in a storage device in the display control circuit 120 or in a storage device outside the display control circuit 120, depending on the circuit design. In particular, the storage device is, for example, a read-only memory (ROM) or a solid-state drive (SSD), but the embodiments of the invention are not limited thereto.

Figure 1B:
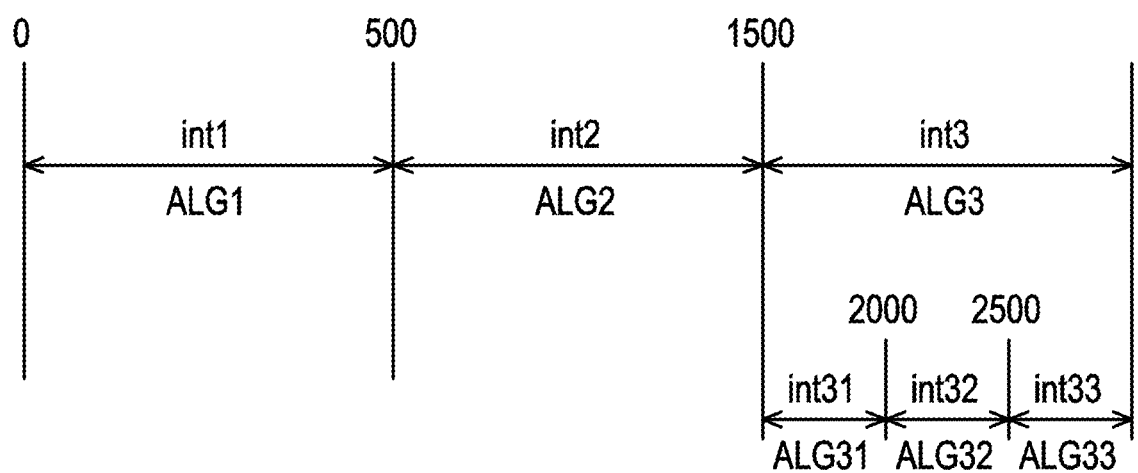
FIG. 1B is a schematic distribution diagram of brightness intervals and brightness adjustment algorithms according to an embodiment of the invention.

FIG. 1B is a schematic distribution diagram of brightness intervals and brightness adjustment algorithms according to an embodiment of the invention. Please refer to FIG. 1A and FIG. 1B. In the present embodiment, based on the brightness threshold 0, 500 nits, and 1500 nits, about three brightness intervals are formed, that is, the first brightness interval int1, the second brightness interval int2, and the third brightness interval int3.

When the ambient light brightness value Bamb is located in the first brightness interval int1, the backlight brightness values of the display areas (such as R11 to R22) may be adjusted using the first brightness adjustment algorithm ALG1; when the ambient light brightness value Bamb is located in the second brightness interval int2 higher than the first brightness interval int1, the backlight brightness values of the display areas (such as R11 to R22) may be adjusted using the second brightness adjustment algorithm ALG2 different from the first brightness adjustment algorithm ALG1; when the ambient light brightness value Bamb is located in the third brightness interval int3 higher than the second brightness interval int2, the backlight brightness values may be adjusted using a third brightness adjustment algorithm (such as one of ALG31 to ALG33) different from the first brightness adjustment algorithm ALG1 and the second brightness adjustment algorithm ALG2.

Furthermore, the third brightness interval int3 may be further divided into three sub-brightness intervals int31, int32, and int33 based on the brightness thresholds of 1500 nits, 2000 nits, and 2500 nits. Moreover, the sub-brightness intervals int31, int32, and int33 respectively apply corresponding one of the third brightness adjustment algorithms ALG31 to ALG33. In particular, for the first brightness adjustment algorithm ALG1, the second brightness adjustment algorithm ALG2, and the third brightness adjustment algorithms ALG31 to ALG33, please refer to the following description.

Figure 2A:
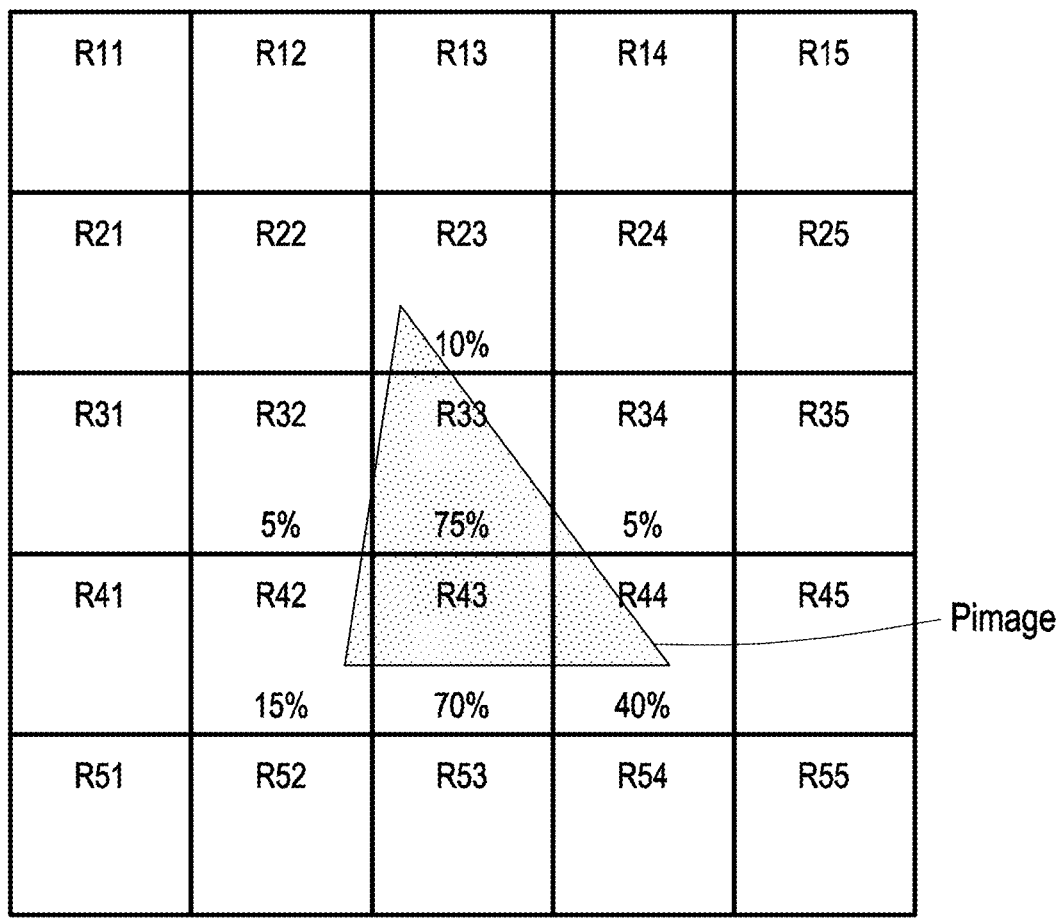
FIG. 2A is a schematic diagram of regional backlight modulation of a first brightness adjustment algorithm according to an embodiment of the invention.

FIG. 2A is a schematic diagram of regional backlight modulation of the first brightness adjustment algorithm according to an embodiment of the invention. Please refer to FIG. 1A, FIG. 1B, and FIG. 2A. In the present embodiment, for example, the display control circuit 120 adjusts the backlight brightness values of the display areas (e.g., R11 to R55) using the first brightness adjustment algorithm ALG1. In the present embodiment, the display control circuit 120 calculates the area proportion occupied by the projected image Pimage in each of the display areas R11 to R55. Next, the display control circuit 120 correspondingly adjusts the backlight brightness values of the display areas R11 to R55 based on the calculated area ratio.

As shown in FIG. 2A, the display areas R11 to R15, R21, R22, R24, R25, R31, R35, R41, R45, and R51 to R55 do not display the projected image Pimage. That is, the area ratio of the display areas R11 to R15, R21, R22, R24, R25, R31, R35, R41, R45, and R51 to R55 is 0. Therefore, the backlight brightness values of the display areas R11 to R15, R21, R22, R24, R25, R31, R35, R41, R45, and R51 to R55 are set to 0% (that is, the backlight is not lit). Relatively speaking, the area ratio of the display area R23 is 10%, that is, the backlight brightness value of the display area R23 is set to 10%; the area ratio of the display area R32 is 5%, that is, the backlight brightness value of the display area R32 is set to 5%. The rest is as shown in FIG. 2A and is not described again here.

In other words, in the present embodiment, when the display control circuit 120 adjusts the backlight brightness values of the display areas (such as R11 to R55) using the first brightness adjustment algorithm ALG1, the backlight brightness value of each of the display areas R11 to R55 is set to the same area ratio occupied by the projected image Pimage in each of the display areas R11 to R55.

Figure 2B:
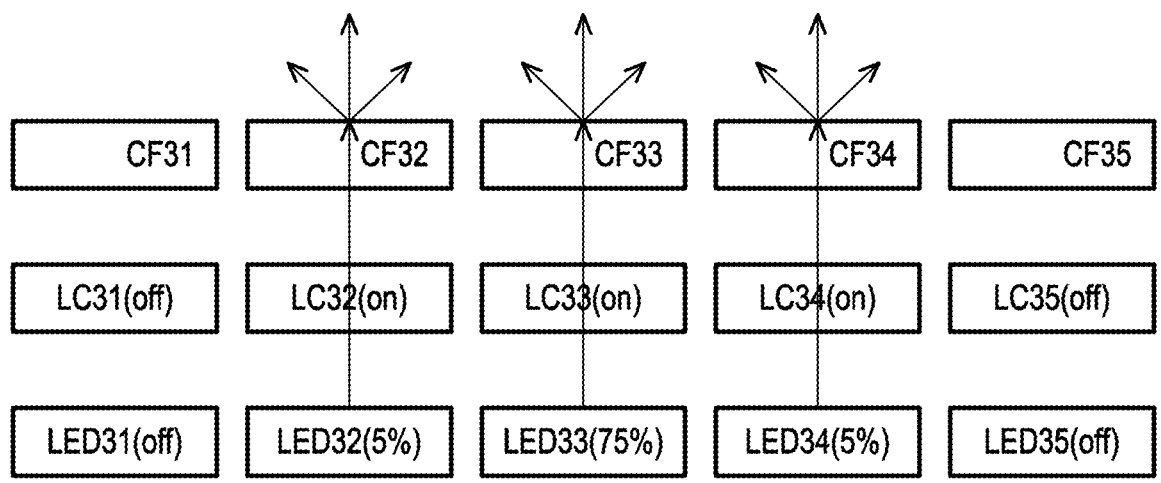
FIG. 2B is a schematic diagram of the light expansion of a projection display panel of the first brightness adjustment algorithm according to an embodiment of the invention.

FIG. 2B is a schematic diagram of the light expansion of the projection display panel of the first brightness adjustment algorithm according to an embodiment of the invention. Please refer to FIG. 1A, FIG. 1B, FIG. 2A, and FIG. 2B. In the present embodiment, a vertical structure of the display areas R31 to R35 is presented. That is, the display area R31 is configured with at least a stacked color filter CF31, liquid-crystal layer LC31, and light-emitting diode backlight module LED31; the display area R32 is configured with at least a stacked color filter CF32, liquid-crystal layer LC32, and light-emitting diode backlight module LED32; and the display area R33 is configured with at least a stacked color filter CF33, liquid-crystal layer LC33, and light-emitting diode backlight module LED33. The rest is as shown in FIG. 2B and is not described again here.

In the present embodiment, the area ratio of the display area R31 is 0%, so the brightness value (that is, the backlight brightness value) of the light-emitting diode backlight module LED31 is set to 0% (that is, not emitting light (off)), and the liquid-crystal layer LC31 is turned off; the area ratio of the display area R32 is 5%, so the brightness value (that is, the backlight brightness value) of the light-emitting diode backlight module LED32 is set to 5%, and the liquid-crystal layer LC32 is opened to allow the light to be directly transmitted to the color filter CF32 for divergence; the area ratio of the display area R33 is 75%, so the brightness value (that is, the backlight brightness value) of the light-emitting diode backlight module LED33 is set to 75%, and the liquid-crystal layer LC33 is turned on to allow the light to be directly transmitted to the color filter CF33 for divergence. The rest is as shown in FIG. 2A and FIG. 2B and is not described again here.

FIG. 3A is a schematic diagram of regional backlight modulation of the second brightness adjustment algorithm according to an embodiment of the invention. Please refer to FIG. 1A, FIG. 1B, FIG. 2A, and FIG. 3A. In the present embodiment, for example, the display control circuit 120 adjusts the backlight brightness values of the display areas (e.g., R11 to R55) using the second brightness adjustment algorithm ALG2. In the present embodiment, the display control circuit 120 calculates at least one projection display area (i.e., the display areas R23, R32 to R34, R42, to R44 occupied by the projected image Pimage) corresponding to the projected image Pimage in the display areas R11 to R55. Then, the backlight brightness values of the display areas R23, R32 to R34, and R42 to R44 occupied by the projected image Pimage are set to a maximum brightness value (that is, 100%). That is, in the second brightness adjustment algorithm ALG2, it is not necessary to calculate the area proportion occupied by the projected image Pimage in each of the display areas R11 to R55.

As shown in FIG. 3A, the display areas R11 to R15, R21, R22, R24, R25, R31, R35, R41, R45, and R51 to R55 do not display the projected image Pimage. Therefore, the backlight brightness values of the display areas R11 to R15, R21, R22, R24, R25, R31, R35, R41, R45, and R51 to R55 are set to 0% (that is, the backlight is not lit). Relatively speaking, the display areas R23, R32 to R34, and R42 to R44 are occupied by the projected image Pimage, so the backlight brightness values of the display areas R23, R32 to R34, and R42 to R44 are set to 100%.

Figure 3B:
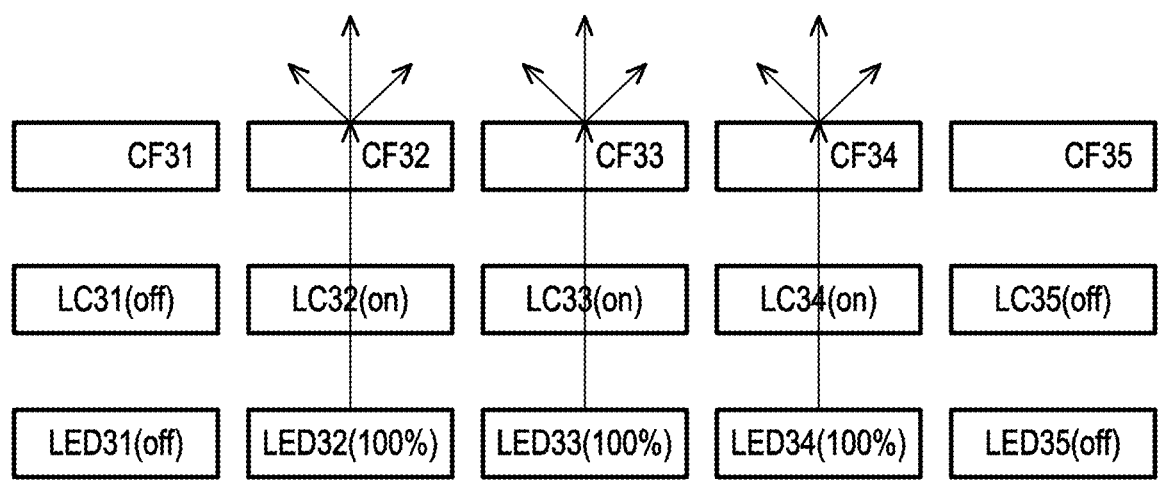
FIG. 3B is a schematic diagram of the light expansion of a projection display panel of the second brightness adjustment algorithm according to an embodiment of the invention.

FIG. 3B is a schematic diagram of the light expansion of the projection display panel of the second brightness adjustment algorithm according to an embodiment of the invention. Please refer to FIG. 1A, FIG. 1B, FIG. 2B, FIG. 3A, and FIG. 3B. In the present embodiment, a vertical structure of the display areas R31 to R35 is presented. Moreover, in the present embodiment, the brightness values of the light-emitting diode backlight modules LED31 and LED35 are set to 0% (that is, not emitting light (off)), the liquid-crystal layers LC31 and LC35 are turned off; and the brightness values of the light-emitting diode backlight modules LED32 to LED34 are set to 100%, and the liquid-crystal layers LC32 to LC34 are turned on to allow the light to be directly transmitted to the color filters CF32 to CF34 for divergence.

FIG. 4A is a schematic diagram of regional backlight modulation of the third brightness adjustment algorithm according to an embodiment of the invention. Referring to FIG. 1A, FIG. 1B, FIG. 2A, and FIG. 4A, in the present embodiment, for example, the display control circuit 120 adjusts the backlight brightness values of the display areas (e.g., R11 to R55) using the third brightness adjustment algorithm ALG33 selected from the brightness adjustment algorithms ALG1, ALG2, ALG31, ALG32, and ALG33. In the present embodiment, the display control circuit 120 calculates at least one projection display area (i.e., the display areas R23, R32 to R34, R42, to R44 occupied by the projected image Pimage) corresponding to the projected image Pimage in the display areas R11 to R55. Then, the backlight brightness values of the display areas R23, R32 to R34, and R42 to R44 occupied by the projected image Pimage are set to the maximum brightness value (that is, 100%), and the backlight brightness values of the display areas R13, R22, R24, R31, R35, R41, R45, R52, R52, and R54 adjacent to the display areas R23, R32 to R34, and R42 to R44 occupied by the projected image Pimage are set to the maximum brightness value (that is, 100%). That is, in the third brightness adjustment algorithm ALG33, it is not necessary to calculate the area proportion occupied by the projected image Pimage in each of the display areas R11 to R55.

Figure 4B:
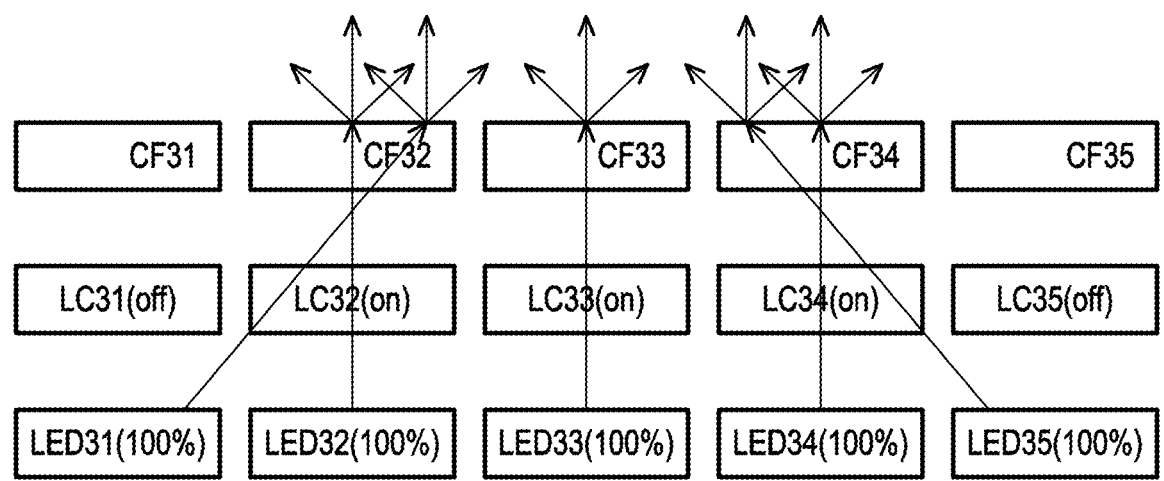
FIG. 4B is a schematic diagram of the light expansion of a projection display panel of the third brightness adjustment algorithm according to an embodiment of the invention.

FIG. 4B is a schematic diagram of the light expansion of the projection display panel of the third brightness adjustment algorithm according to an embodiment of the invention. Please refer to FIG. 1A, FIG. 1B, FIG. 2B, FIG. 4A, and FIG. 4B. In the present embodiment, the brightness values of the light-emitting diode backlight modules LED31 to LED35 are set to 100%, and the liquid-crystal layers LC32 to LC34 are turned on to allow the light to be directly transmitted to the color filters CF32 to CF34 for divergence. However, the liquid-crystal layers LC31 and LC35 are turned off, so that the light of the light-emitting diode backlight modules LED31 and LED35 is transmitted to the color filters CF32 to CF34 via the opened liquid-crystal layers LC32 and LC34 and diverged. Accordingly, by lighting the light-emitting diode backlight modules LED31 and LED35 (that is, the backlight of the adjacent display area), the overall brightness of the projected image Pimage may be increased, thereby improving the visibility of the projected image Pimage under the bright sun.

FIG. 4C is a schematic diagram of regional backlight modulation of the fourth brightness adjustment algorithm according to an embodiment of the invention. Referring to FIG. 1A, FIG. 1B, FIG. 2A, FIG. 4A, and FIG. 4C, in the present embodiment, for example, the display control circuit 120 adjusts the backlight brightness values of the display areas (e.g., R11 to R55) using the third brightness adjustment algorithm ALG32 selected from the brightness adjustment algorithms ALG1, ALG2, ALG31, ALG32, and ALG33. In the present embodiment, the display control circuit 120 calculates the area proportion occupied by the projected image Pimage in each of the display areas R11 to R55. Then, the backlight brightness values of the display areas R23, R32 to R34, and R42 to R44 occupied by the projected image Pimage are set to the maximum brightness value (that is, 100%), and the backlight brightness values of the display areas R13, R22, R24, R31, R35, R41, R45, R52, R52, and R54 adjacent to the display areas R23, R32 to R34, and R42 to R44 occupied by the projected image Pimage are each determined based on the area ratio of adjacent projection display areas in the display areas R23, R32 to R34, and R42 to R44 occupied by the projected image Pimage.

For example, the backlight brightness value of the display area R13 is set to 10% of the area ratio of the adjacent projection display area R23; the backlight brightness value of the display area R22 is set to 7.5%, the average of the area ratios of 10% and 5% of the adjacent projection display areas R23 and R32; and the backlight brightness value of the display area R24 is set to 7.5%, the average of the area ratios of 10% and 5% of the adjacent projection display areas R23 and R34. The rest is as provided in FIG. 4C and is not described again here.

Figure 4D:
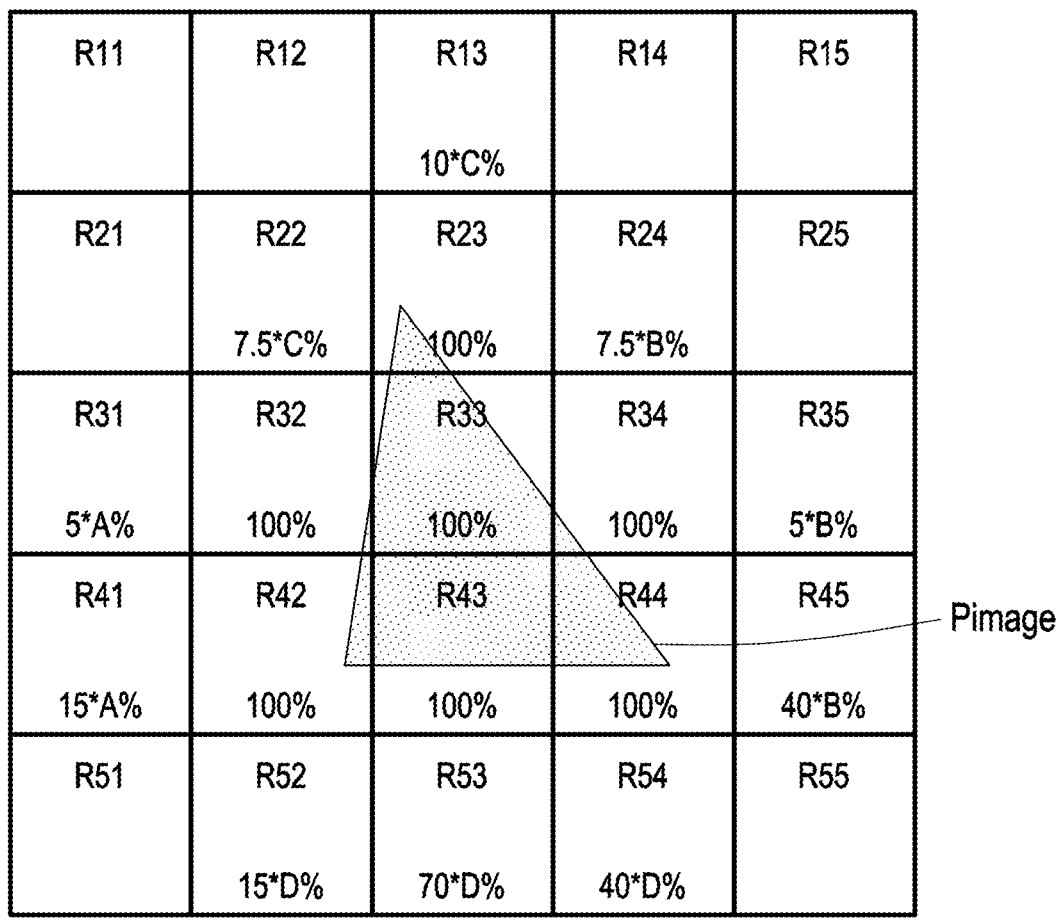
FIG. 4D is a schematic diagram of regional backlight modulation of a fifth brightness adjustment algorithm according to an embodiment of the invention.

FIG. 4D is a schematic diagram of regional backlight modulation of the fifth brightness adjustment algorithm according to an embodiment of the invention. Referring to FIG. 1A, FIG. 1B, FIG. 2A, FIG. 4A, and FIG. 4C, in the present embodiment, for example, the display control circuit 120 adjusts the backlight brightness values of the display areas (e.g., R11 to R55) using the third brightness adjustment algorithm ALG32 selected from the brightness adjustment algorithms ALG1, ALG2, ALG31, ALG32, and ALG33. In the present embodiment, the display control circuit 120 calculates the area proportion occupied by the projected image Pimage in each of the display areas R11 to R55. Then, the backlight brightness values of the display areas R23, R32 to R34, and R42 to R44 occupied by the projected image Pimage are set to the maximum brightness value (that is, 100%), and the backlight brightness values of the display areas R13, R22, R24, R31, R35, R41, R45, R52, R52, and R54 adjacent to the display areas R23, R32 to R34, and R42 to R44 occupied by the projected image Pimage are each determined based on the area ratio of adjacent projection display areas in the display areas R23, R32 to R34, and R42 to R44 occupied by the projected image Pimage and the corresponding focus weight value.

For example, the backlight brightness value of the display area R13 is set to the product of 10% of the area ratio of the adjacent projection display area R23 and a focus weight value C; the backlight brightness value of the display area R22 is set to the product of the average 7.5% of the area ratios of 10% and 5% of the adjacent projection display areas R23 and R32 and the focus weight value C; and the backlight brightness value of the display area R24 is set to the product of the average 7.5% of the area ratios of 10% and 5% of the adjacent projection display areas R23 and R34 and a focus weight value D. The rest is as provided in FIG. 4D and is not described again here.

In particular, focus weight values A to D may be any positive decimal between 0 and 1, and the focus weight values A to D take into account the position of the eye point passenger (or the driver) and the shape of the projected image Pimage projected on the windshield.

According to the embodiments of FIG. 4A to FIG. 4D, in the third brightness interval int3, the third brightness adjustment algorithm adopted may be any one of the third brightness adjustment algorithms ALG31 to ALG32. That is, in the third brightness interval int3, the display control circuit 120 calculates at least one projection display area (such as the display areas R11 to R55) corresponding to (or occupied by) the projected image Pimage in the display areas R11 to R55. Then, the backlight brightness values of the projection display areas (such as the display areas R11 to R55) are set to the maximum brightness value (that is, 100%). Moreover, the backlight brightness values of at least one adjacent display area (e.g., the display areas R11 to R55) adjacent to at least one projection display area (e.g., the display areas R11 to R55) are set to be greater than 0.

Figure 5:
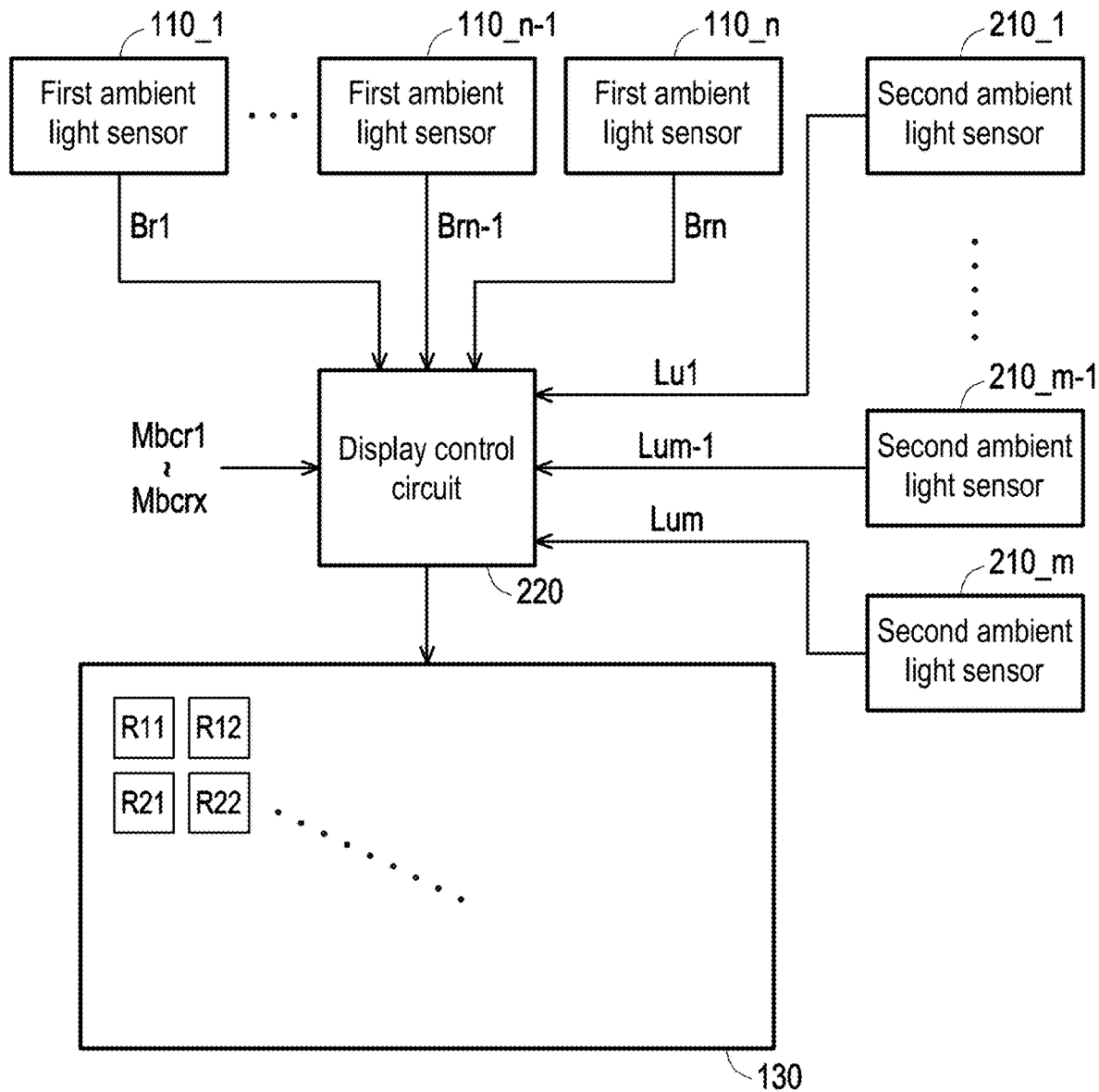
FIG. 5 is a system schematic diagram of a head-up display system according to another embodiment of the invention.

FIG. 5 is a system schematic diagram of a head-up display system according to another embodiment of the invention. Please refer to FIG. 1A and FIG. 5. A head-up display system 200 is substantially the same as the head-up display system 100. The difference is that the head-up display system 200 further includes a plurality of second ambient light sensors 210_1 to 210_m, wherein m is a positive integer greater than or equal to 1, and the same or similar elements adopt the same or similar reference numerals.

In the present embodiment, the second ambient light sensors 210_1 to 210_m are coupled to a display control circuit 220 and used to provide a plurality of brightness correction reference values Lu1 to Lum to the display control circuit 220. Furthermore, the display control circuit 220 selects one of a plurality of brightness uniformity correction matrices Mbcr1 to Mbcrx based on the brightness correction reference values Lu1 to Lum, and adjusts the backlight brightness values of the display areas (such as R11 to R22) based on the selected adjustment algorithm and the selected brightness uniformity correction matrices Mbcr1 to Mbcrx, wherein x is a positive integer greater than or equal to 1.

In the present embodiment, the brightness uniformity correction matrices Mbcr1 to Mbcrx may be stored in a storage device in the display control circuit 220 or in a storage device outside the display control circuit 220, depending on the circuit design.

In an embodiment of the invention, the second ambient light sensors 210_1 to 210_m may be replaced by cameras. At this time, when the camera captures the current image, the display control circuit 220 may digitize the data and integrate the data to obtain the glare correction matrix.

Figure 6A:
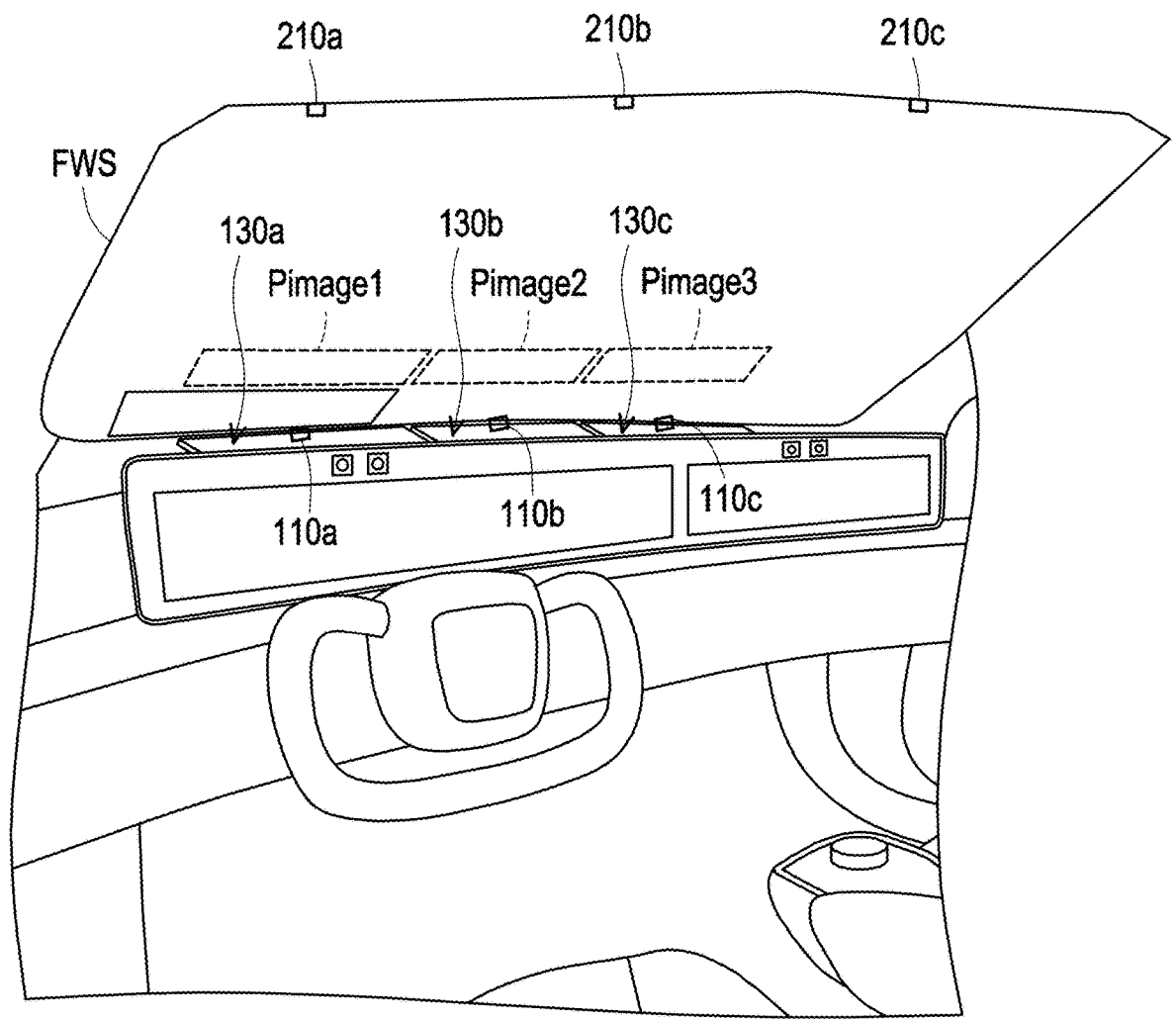
FIG. 6A is a schematic diagram of image projection of a head-up display system applied to a vehicle according to an embodiment of the invention.

FIG. 6A is a schematic diagram of image projection of a head-up display system applied to a vehicle according to an embodiment of the invention. Please refer to FIG. 1A, FIG. 5, and FIG. 6A. In the present embodiment, the lower edge of a windshield FWS is equipped with first ambient light sensors 110a to 110c, the upper edge of the windshield FWS is equipped with second ambient light sensors 210a to 210c, and the bottom of the windshield FWS is equipped with projection display panels 130a to 130c to project projected images Pimage1 to Pimage3 to the lower side of the windshield FWS.

Figure 6B:
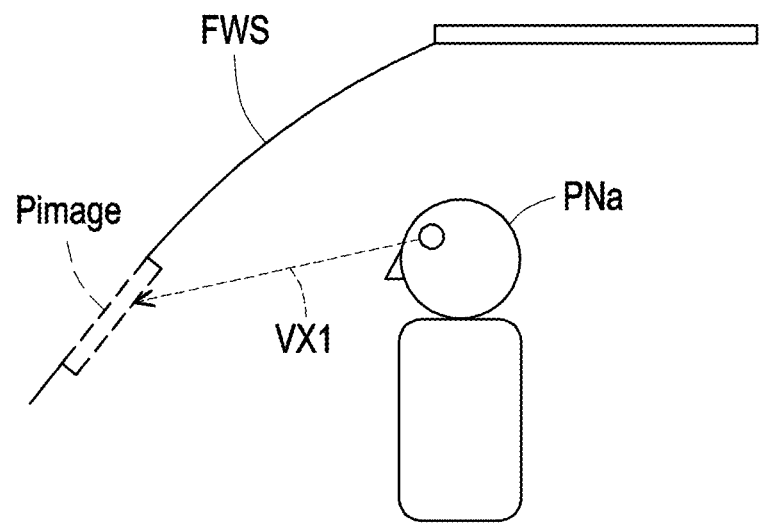
FIG. 6B is a schematic diagram of the vertical angle of view light expansion of a head-up display system applied to a vehicle according to an embodiment of the invention.
Figure 6C:
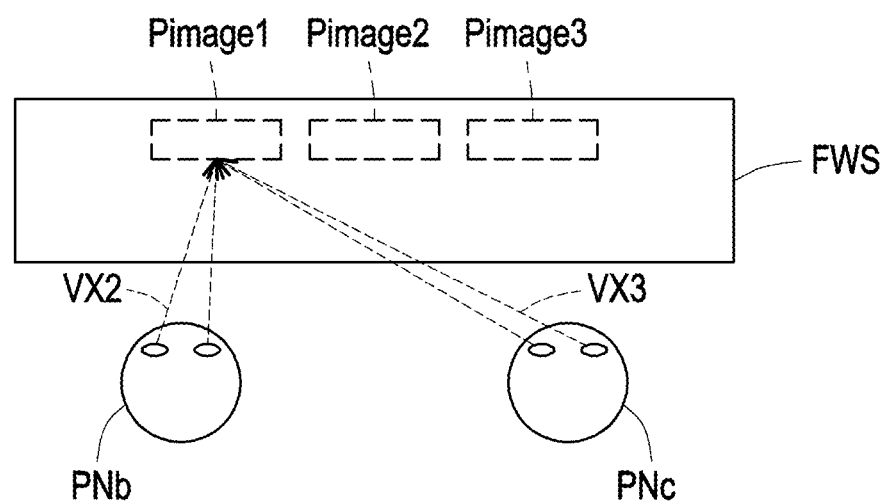
FIG. 6C is a schematic horizontal perspective view of a head-up display system applied to a vehicle according to an embodiment of the invention.

FIG. 6B is a schematic diagram of the vertical angle of view light expansion of a head-up display system applied to a vehicle according to an embodiment of the invention. FIG. 6C is a schematic horizontal perspective view of a head-up display system applied to a vehicle according to an embodiment of the invention. Please refer to FIG. 1A, FIG. 5, and FIG. 6A to FIG. 6C, relative to the projected image (such as Pimage, Pimage1 to Pimage3) on the windshield FWS, the line of sight (such as VX1 to VX3) of a passenger (such as PNa to PNc) is varied depending on the height and the seating position of the passenger (such as PNa to PNc). That is, the projected image (such as Pimage, Pimage1 to Pimage3) viewed by the passenger (such as PNa to PNc) at different heights and different sitting positions is different. That is, the eye point position of the passenger (such as PNa to PNc) affects the color performance of the projected image (such as Pimage, Pimage1 to Pimage3).

Figure 7:
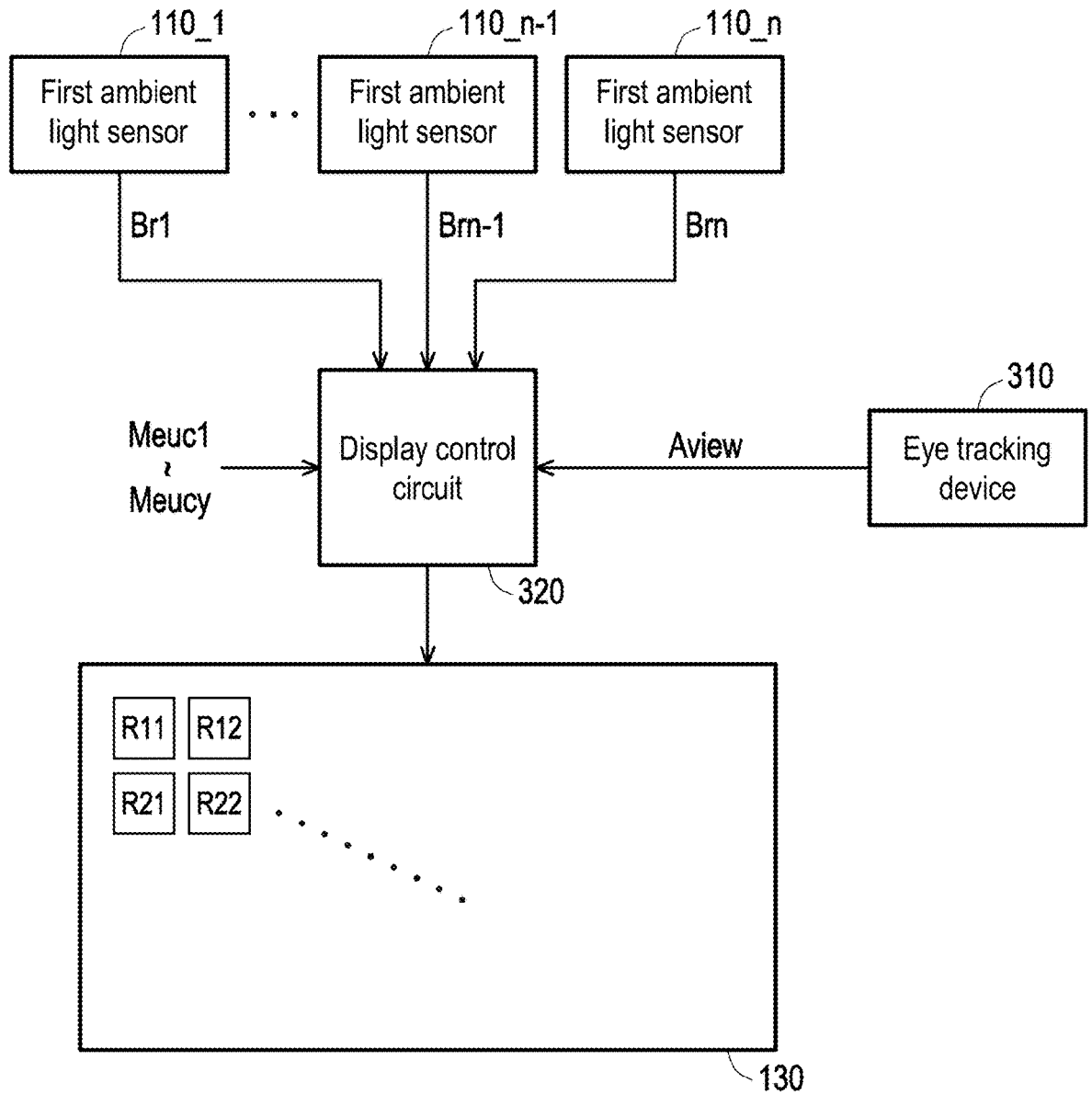
FIG. 7 is a system schematic diagram of a head-up display system according to another embodiment of the invention.

FIG. 7 is a system schematic diagram of a head-up display system according to another embodiment of the invention. Please refer to FIG. 1A and FIG. 7. A head-up display system 300 is substantially the same as the head-up display system 100. The difference is that the head-up display system 300 further includes an eye tracking device 310, wherein identical or similar elements adopt the same or similar reference numerals.

In the present embodiment, the eye tracking device 310 (e.g., at least one camera or similar device) is used to confirm a plurality of eye point positions Aview of at least one passenger (PNa to PNc as shown in FIG. 6B and FIG. 6C). Moreover, a display control circuit 320 selects one of a plurality of eye point uniformity correction matrices (such as Meuc1 to Meucy) based on the eye point position Aview, and based on the selected adjustment algorithm and the selected eye point uniformity correction matrices Meuc1 to Meucy, adjusts the backlight brightness values of the display areas (such as R11 to R22), wherein y is a positive integer greater than or equal to 1. In particular, the eye point uniformity correction matrix (such as Meuc1 to Meucy) takes into account the position of the eye point of the passenger (or the driver) and the shape of the windshield projected by the projected image to alleviate the uniformity issues caused by the shape of the windshield and the eye point position.

In the present embodiment, the eye point uniformity correction matrices Meuc1 to Meucy may be stored in a storage device in the display control circuit 220 or in a storage device outside the display control circuit 220, depending on the circuit design.

Figure 8:
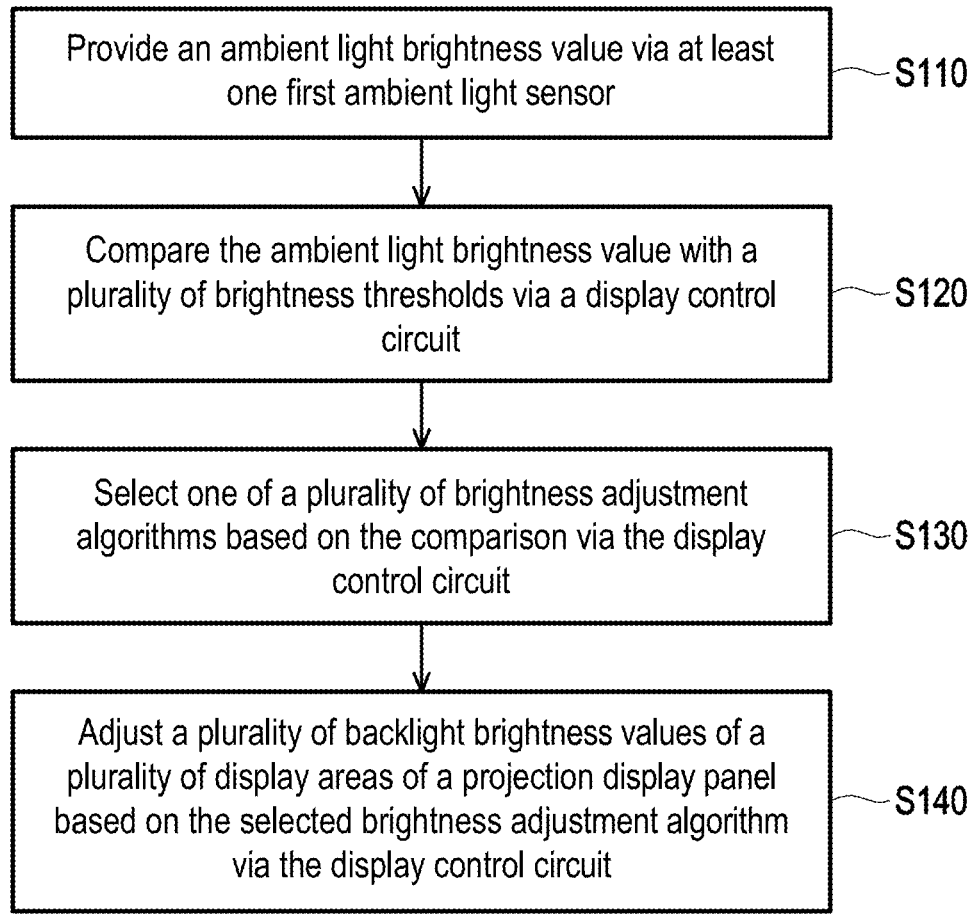
FIG. 8 is a system schematic diagram of a backlight adjusting method of a head-up display system according to an embodiment of the invention.

FIG. 8 is a system schematic diagram of a backlight adjusting method of a head-up display system according to an embodiment of the invention. Please refer to FIG. 8. In the present embodiment, the backlight adjusting method of the head-up display system includes the following steps. In step S110, an ambient light brightness value is provided via at least one first ambient light sensor. In step S120, the ambient light brightness value is compared with a plurality of brightness thresholds via a display control circuit. In step S130, one of a plurality of brightness adjustment algorithms is selected based on the comparison via the display control circuit. In step S140, a plurality of backlight brightness values of a plurality of display areas of a projection display panel are adjusted based on the selected brightness adjustment algorithm via the display control circuit. In particular, the order of steps S110, S120, S130, and S140 is for illustration, and the implementation of the invention is not limited thereto. Furthermore, the details of steps S110, S120, S130, and S140 may be as provided in the embodiments shown in FIG. 1 to FIG. 7, and are not described again here.

Based on the above, in the head-up display system and the backlight adjusting method thereof of an embodiment of the invention, since the display control circuit evaluates the ambient brightness based on the ambient light brightness value and the brightness threshold, and selects one of the brightness adjustment algorithms accordingly, the display control circuit may adjust the backlight brightness values of the display areas of the projection display panel according to different lighting conditions to suit the current usage situation, thereby providing good visual effects.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. A head-up display system, comprising:
  at least one first ambient light sensor used to provide an ambient light brightness value;
  a projection display panel having a plurality of display areas;
  a display control circuit coupled to the at least one first ambient light sensor and the projection display panel for comparing the ambient light brightness value with a plurality of brightness thresholds, so as to select one of a plurality of brightness adjustment algorithms based on the comparison, and adjust a plurality of backlight brightness values of the display areas based on the selected brightness adjustment algorithm,
  wherein the display control circuit is further used to:
    adjust the backlight brightness values using a first brightness adjustment algorithm when the ambient light brightness value is located in a first brightness interval, adjust the backlight brightness values using a second brightness adjustment algorithm different from the first brightness adjustment algorithm when the ambient light brightness value is located in a second brightness interval higher than the first brightness interval, and adjusting the backlight brightness values using a third brightness adjustment algorithm different from the first brightness adjustment algorithm and the second brightness adjustment algorithm when the ambient light brightness value is located in a third brightness interval higher than the second brightness interval.

2. The head-up display system of claim 1, wherein when the display control circuit uses a brightness adjustment algorithm of the selected brightness adjustment algorithms, it is used to:

calculate at least one projection display area corresponding to a projected image in the display areas;

set the backlight brightness values of the at least one projection display area to a maximum brightness value; and set each of the backlight brightness values of at least one adjacent display area adjacent to the at least one projection display area based on at least an area ratio of an adjacent projection display area occupied by the projected image and an eye point weight value.

3. The head-up display system of claim 1, further comprising:

an eye tracking device for confirming a plurality of eye point positions of at least one passenger, wherein the display control circuit selects one of a plurality of eye point uniformity correction matrices based on the eye point positions, and adjusts the backlight brightness values of the display areas based on the selected adjustment algorithm and the selected eye point uniformity correction matrix.

4. The head-up display system of claim 1, further comprising:

a plurality of second ambient light sensors used to provide a plurality of brightness correction reference values, wherein the display control circuit selects one of a plurality of brightness uniformity correction matrices based on the brightness correction reference values, and adjusts the backlight brightness values of the display areas based on the selected adjustment algorithm and the selected brightness uniformity correction matrix.

5. The head-up display system of claim 1, wherein the at least one first ambient light sensor is a plurality of first ambient light sensors, and the display control circuit uses a highest of a plurality of output brightness values of the first ambient light sensors as the ambient light brightness value.

6. A backlight adjusting method of a head-up display system, comprising:

providing an ambient light brightness value via at least one first ambient light sensor;

comparing the ambient light brightness value with a plurality of brightness thresholds via a display control circuit;

selecting one of a plurality of brightness adjustment algorithms based on the comparison via the display control circuit; and adjusting a plurality of backlight brightness values of a plurality of display areas of a projection display panel based on the selected brightness adjustment algorithm via the display control circuit, wherein adjusting the backlight brightness values based on the selected adjustment algorithm comprises:

adjusting the backlight brightness values using a first brightness adjustment algorithm when the ambient light brightness value is located in a first brightness interval;

adjusting the backlight brightness values using a second brightness adjustment algorithm different from the first brightness adjustment algorithm when the ambient light brightness value is located in a second brightness interval higher than the first brightness interval; and adjusting the backlight brightness values using a third brightness adjustment algorithm different from the first brightness adjustment algorithm and the second brightness adjustment algorithm when the ambient light brightness value is located in a third brightness interval higher than the second brightness interval.

7. The backlight adjusting method of claim 6, wherein adjusting the backlight brightness values using one of the selected brightness adjustment algorithms comprises:

calculating at least one projection display area corresponding to a projected image in the display areas;

setting the backlight brightness values of the at least one projection display area to a maximum brightness value; and setting each of the backlight brightness values of at least one adjacent display area adjacent to the at least one projection display area based on at least an area ratio of an adjacent projection display area occupied by a projected image and an eye point weight value.

8. The backlight adjusting method of claim 6, further comprising:

confirming a plurality of eye point positions of at least one passenger via an eye tracking device;

selecting one of a plurality of eye point uniformity correction matrices based on the eye point positions via the display control circuit; and adjusting the backlight brightness values based on the selected adjustment algorithm and the selected eye point uniformity correction matrix via the display control circuit.

9. The backlight adjusting method of claim 6, further comprising:

providing a plurality of brightness correction reference values via a plurality of second ambient light sensors; and selecting one of a plurality of brightness uniformity correction matrices based on the brightness correction reference values via the display control circuit; and adjusting the backlight brightness values of the display areas based on the selected adjustment algorithm and the selected brightness uniformity correction matrix via the display control circuit.

10. The backlight adjusting method of claim 6, wherein the at least one first ambient light sensor is a plurality of first ambient light sensors, and the ambient light brightness value is a highest of a plurality of output brightness values of the first ambient light sensors.

11. A head-up display system, comprising:

at least one first ambient light sensor used to provide an ambient light brightness value;

a projection display panel having a plurality of display areas;

a display control circuit coupled to the at least one first ambient light sensor and the projection display panel for comparing the ambient light brightness value with a plurality of brightness thresholds, so as to select one of a plurality of brightness adjustment algorithms based on the comparison, and adjust a plurality of backlight brightness values of the display areas based on the selected brightness adjustment algorithm, wherein when the display control circuit uses a brightness adjustment algorithm of the selected brightness adjustment algorithms, it is used to:

calculate at least one projection display area corresponding to a projected image in the display areas;

set the backlight brightness values of the at least one projection display area to a maximum brightness value; and set each of the backlight brightness values of at least one adjacent display area adjacent to the at least one projection display area based on at least an area ratio of an adjacent projection display area occupied by the projected image and an eye point weight value.

* * * * *